(12) United States Patent
Endo

(10) Patent No.: US 6,721,863 B1
(45) Date of Patent: Apr. 13, 2004

(54) DISK CONTROL MECHANISM PREFERABLE FOR RANDOM DISK WRITE

(75) Inventor: Kotaro Endo, Fuchu (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 563 days.

(21) Appl. No.: 09/659,507

(22) Filed: Sep. 11, 2000

(30) Foreign Application Priority Data

Feb. 29, 2000 (JP) ........................................ 2000-053814

(51) Int. Cl.[7] .............................................. G06F 12/00
(52) U.S. Cl. .................... 711/165; 711/112; 711/114; 711/100; 711/154
(58) Field of Search ................................ 711/165, 112, 711/114, 100, 154; 714/7, 20

(56) References Cited

U.S. PATENT DOCUMENTS

| | | | | |
|---|---|---|---|---|
| 5,557,770 A | * | 9/1996 | Bhide et al. ................. | 711/161 |
| 5,708,793 A | * | 1/1998 | Franaszek et al. ........... | 711/112 |
| 5,860,103 A | * | 1/1999 | Franaszek et al. ........... | 711/133 |
| 5,966,708 A | * | 10/1999 | Clark et al. .................. | 707/101 |
| 6,233,648 B1 | * | 5/2001 | Tomita .......................... | 711/4 |
| 6,345,280 B1 | * | 2/2002 | Clark et al. .................. | 707/200 |

FOREIGN PATENT DOCUMENTS

JP          11-53235          2/1999

* cited by examiner

*Primary Examiner*—Matthew Kim
*Assistant Examiner*—Stephen Elmore
(74) *Attorney, Agent, or Firm*—Finnegan, Henderson, Farabow, Garrett & Dunner, L.L.P.

(57) ABSTRACT

When a write processing portion in the disk driver receives a plurality of write requests from an application program, the write processing portion divides the data designated by the request into the data block unit, adds the control block including the reverse index showing a position on the original region on the disk apparatus where the data block is supposed to be originally written in the data block queue, and store the data in the log region secured separately from the original region on the disk apparatus. The rearrangement processing portion repeats an operation of rearranging the oldest effective data block to a position on the original region where the data block are supposed to be originally written. The recovery processing portion takes out the reverse index from the control block on the log region to recover the forward index.

13 Claims, 13 Drawing Sheets

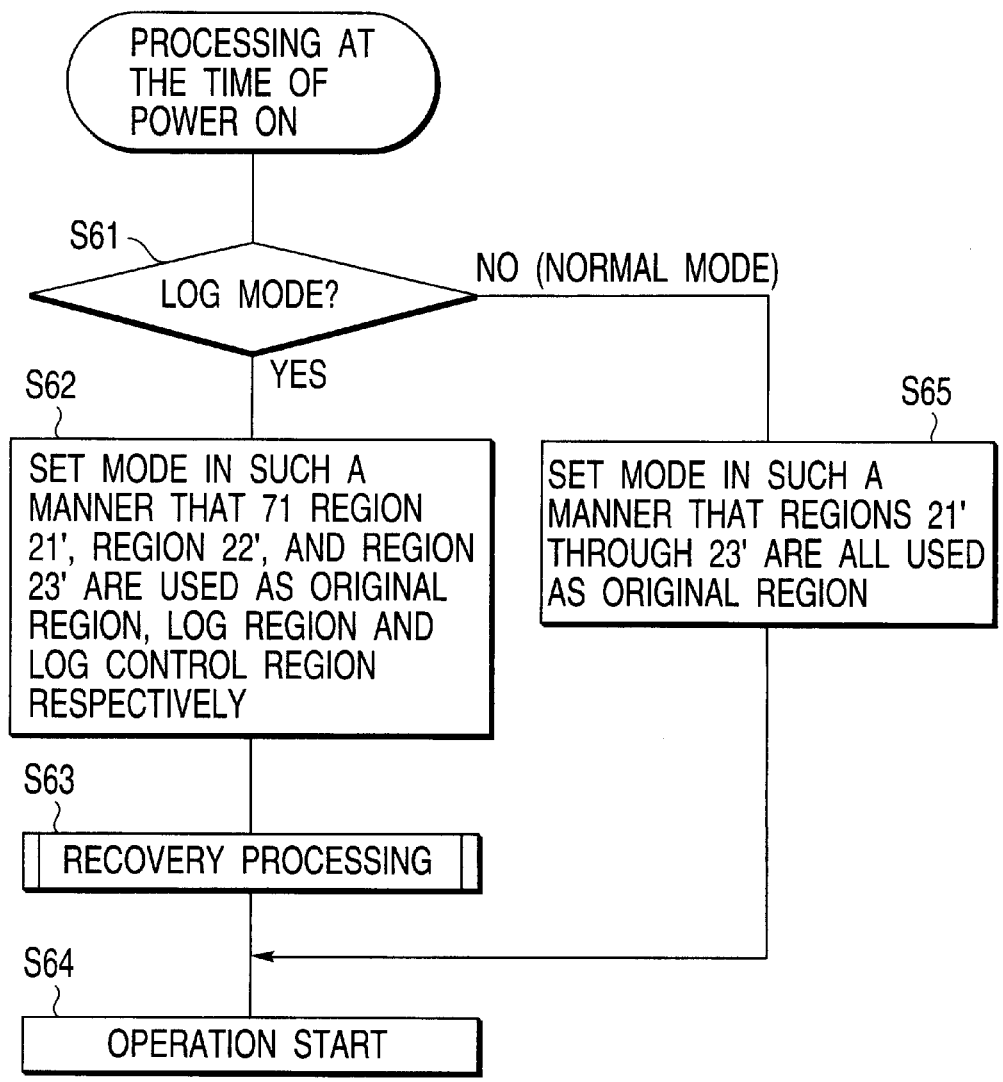
F I G. 14

DISK CONTROL MECHANISM PREFERABLE FOR RANDOM DISK WRITE

CROSS-REFERENCE TO RELATED APPLICATIONS

This application is based upon and claims the benefit of priority from the prior Japanese Patent Application No. 2000-053814, filed Feb. 29, 2000, the entire contents of which are incorporated herein by reference.

BACKGROUND OF THE INVENTION

The present invention relates to a disk control mechanism capable of increasing a speed of a random write with respect to a disk apparatus (a disk memory apparatus) represented by a magnetic disk apparatus in a computer system.

In recent years, there is proposed a log structured file system (LFS) as described in, for example, Jpn. Pat. Appln. KOKAI Publication No. 11-53235 as a technique for increasing the speed of the random write with respect to a disk apparatus in a computer system.

The principle of the log structured file system (hereinafter referred to as LFS) is intended to realize an increase in the speed of the disk write by converting the small block random write to the large block sequential write on the side of the disk control mechanism on the basis of a presupposition peculiar to the disk apparatus to the effect that a large block sequential write of the disk is extremely high in speed as compared with a small block random write. Specifically, data to be written comprising a plurality of small blocks is collected irrespective of its original write position, and is recorded on a disk as a sequential log of one large block with the result that the disk-write speed is increased.

In the case of the application of the LFS, it is necessary to hold information showing a correspondence relationship from the position where a plurality of small blocks of data to be written are supposed to be originally written, namely, the original write position (hereinafter referred to as the original position) intended on the side of a computer to correspond to a position on a log (hereinafter referred to as a log position) and information which stands in a reverse relationship to information showing a correspondence relationship from the log position to the original position. In the foregoing explanation, the former correspondence relationship information is referred to as a forward index while the latter correspondence relationship information is referred to as a reverse index. Furthermore, the both indices are referred to as indices.

The indices are generally held in the computer. As a consequence, when the indices become precarious in the case where the computer comes to a sudden halt because of trouble, the data on the disk unreliable.

Therefore, in the conventional computer system to which the LFS is applied, the indices are held on a dedicated non-volatile memory, for example, an NVRAM (non-volatile random access memory) to provide endurance against damage.

As has been described above, the LFS as disclosed in Jpn. Pat. Appln. KOKAI Publication No. 11-53235 is suitable for realizing an increase in the speed on the random write access to the disk apparatus.

However, the LFS has a problem as described below, and it is important to improve this problem in the practice thereof.

A first problem is that the performance is very likely to be extremely deteriorated with respect to a large block sequential read. The cause thereof is that the large block sequential read has been converted into a small block sequential read as a compensation for the conversion of the small block random write into the large block sequential write. In other words, there is a possibility that the data may be arranged at random at the log position even in the region where the data is continuous at the original position.

A second problem is generated by the application of the LFS to a shared disk in the fail-over system. The fail-over system is a system in which a plurality of computers share the disk apparatus so that even when any computer is damaged, another computer can inherit the processing from the damaged computer. Such a system is referred to as a high availability (HA) system. In this fail-over system, when the primary computer comes to a sudden halt because of trouble, the secondary computer inherits the processing from the primary computer. At this time, the data is handed over to the secondary computer through the shared disk. However, in the LFS, since the index or the like is provided on the non-volatile memory (NVRAM), the data cannot be handed over through the shared disk. In other words, in order to hand over the data, the shared non-volatile memory (NVRAM) becomes necessary.

BRIEF SUMMARY OF THE INVENTION

The present invention has been made in view of the circumstances. An object of the present invention is to provide a disk control mechanism which deals with the rearrangement of data in consideration of the original position of the data the deterioration in the performance of the large block sequential read by the application of the LFS (log structured file system for an increase in the speed of the random write.

Another object of the present invention is to provide a disk control mechanism which eliminates the need of a non-volatile memory and facilitates the inheritance of the indices at the fail-over system by effectively making use of the disk region for the preservation of the indices necessary for the increase in the speed of the random write.

According to a first aspect of the present invention, there is provided a disk control mechanism to which an LFS (log structured file system) is applied wherein data designated by a plurality of disk write requests given from the upper position is collected to be continuously stored in a data block unit having a predetermined size in a region (a log region) which is secured separately from a region (an original region) which can be designated from an upper region on the disk apparatus (namely, which can be seen from the upper position) characterized by comprising rearrangement means for repeating an operation of rearranging the oldest effective data block on the log region at a position on the original region where the data block are supposed to be originally written.

In such a structure, it becomes possible to prevent a reduction in an access performance of a large block sequential read by the application of the LFS because it becomes possible to continuously read the data block from the original region with respect to the read request to a group of data blocks arranged in a continuous region in the original region even if the data blocks are arranged at random at the log position by the rearrangement of the rearrangement means while attempting to increase the speed of a parallel access of the random write (a small block random write) by the application of the LFS.

According to a second aspect of the present invention, there is provided a disk control mechanism to which the LFS is applied, the mechanism being characterized by comprising:

recovery processing means for recovering a forward index in a forward index storage region of a data block secured on a volatile memory, the forward index indicating a correspondence relationship between a position of the data block on the log region and a position on the original region to which the data block is originally written from the reverse index by reading the reverse index from a control block on the log region, namely, at the time of the start-up thereof while allowing the write processing means for collecting data designated by a plurality of disk write requests given from the host device to be provided with a function of adding the control block including the reverse index showing a position on the original region where each of the data blocks which is continuously stored are supposed to be originally written and storing in the log region; and read processing means for judging which of the log region or the original region the data block designated by the read request is stored by referring to the forward index storage region on the basis of the read request when the read request is given from the host device thereby reading the data block from either the log region or the original region on the basis of the judgment result.

In such a structure, an attempt can be made to increase the speed of a parallel access of a random write (a small block random write) by the application of the LFS. Besides, in the structure, the forward index of each of the data blocks can be recovered on the basis of the reverse index in the control block stored in the log region in addition to the data block queue at the time of the start-up (at the time of rise) despite the fact that a volatile memory is used instead of a non-volatile memory such as an NVRAM to hold the forward index of the data block stored in the log region. In other words, even when information on the forward index storage region is temporarily lost because of the generation of the power source shut-off, the information can be recovered at the time of start-up. Thus, the breakage or the loss of the forward index data can be prevented and endurance against trouble can be realized without using the non-volatile memory. Here, when the control block and the data block are set to the same size, the control block can be easily accessed.

According to a third aspect of the present invention, there is provided a disk control mechanism which is characterized by adding to the disk control mechanism according to a second aspect of the invention:

log region control means for controlling a log control region secured on a disk apparatus for conserving a reverse index of each of the data block stored in the log region, the means for conserving the memorized reverse index from a position following the reverse index which has been already preserved at the previous check point for each of the predetermined check point by memorizing on a volatile memory the reverse index included in the control block which is stored in the log region after the previous check point; and recovery means which replaces the recovery means which is applied in the disk control mechanism according to the second aspect of the invention, the means having the following function;

the function of reading the reverse index from the log region up to the most recent checkpoint, and, at the same time, reading the reverse index from the control block stored in the log region after the check point to recover the forward index in the forward index storage region on the basis of the reverse index. Here, when the structure of the mechanism is constituted in such a manner that in correspondence to the arrangement of the control block and the data block on the log region, a dummy of the reverse index (data showing the control block and having the same size as the reverse index) is preserved at the position on the log control region, the reverse index can be read at a high speed from the log control region.

In such a structure, since it is only the reverse index of the data block stored in the log region after the most recent check point that can be directly obtained from the log control region and is required to be recovered from the control block in the log region with respect to the reverse index of the data block stored in the log region up to the most recent check point, time required for the recovery of the forward index at the time of the start-up can be further shortened. Incidentally, it goes without saying that the parallel access of the random write can be increased in speed and, at the same time, the endurance against trouble can be realized without using the non-volatile memory.

According to a fourth aspect of the present invention, there is provided a disk control mechanism which is characterized by adding to the disk control mechanism according to the first aspect of the present invention the write processing means, the recovery processing means, and the read processing means which are applied in the disk control mechanism according to the second aspect of the present invention, and, at the same time, by allowing the rearrangement means to be provided with the function of eliminating the forward index of the data block from the forward index storage region at the time of the rearrangement of the data block.

In such a structure, it becomes possible to obtain two effects: an effect which is obtained in the disk control mechanism according to the first aspect of the present invention, and an effect which is obtained with the disk control mechanism according to the second aspect of the present invention.

According to a fifth aspect of the present invention, there is provided a disk control mechanism which is characterized by adding to the disk control mechanism according to the first aspect of the present invention the write processing means, the log region control means, the recovery processing means, and the read processing means which are applied in the disk control mechanism according to the third aspect of the present invention, and, at the same time, by allowing the rearrangement means to be provided with the next function of eliminating the forward index of the data block from the forward index at the time of rearrangement of the data block.

In such a structure, it becomes possible to obtain two effects: the effect which can be obtained with the disk control mechanism according to the first aspect of the present invention and the effect which can be obtained with the disk control mechanism according to the third aspect of the present invention.

According to a sixth aspect of the present invention, there is provided a disk control mechanism which is characterized by adding to the disk control mechanism according to either of the first, the fourth or the fifth aspect of the invention mode setting means for setting the disk apparatus either to a log mode or to a non-log mode upon receipt of a transition setting instruction either to the log mode or to the non-log mode from the host device, the means setting the mode in such a manner that the data designated by the disk write request given from the host device is written in the log region with the addition of the control block in the log mode and the data is written as it is in the original region in the non-log mode.

In such a structure, the transition of the mode from the log mode to the non-log mode, or the transition from the non-log mode to the log mode can be conducted while the data is preserved as it is. Here, the non-log mode is suitable to a backup processing or the like in which the large block access is made. Here, in the period (for example, business hours) when a transaction processing is frequently generated in which the small block access (in particular, the small random write) is made, the log mode is set. When the non-log mode is set (log mode is released) in the period (for example, except for business hours) when the backup processing is made, the disk access speed can be increased at all times.

Here, when the rearrangement means is provided with the following means, namely, batch rearrangement means for rearranging all the effective data blocks on the log region at a position where the data blocks are supposed to be originally written on the original region, the data reading by the read processing means is conducted to the original region at all times immediately after the transition of the non-log mode with the result that the large block sequential read can be conducted at a high speed from the beginning.

According to a seventh aspect of the present invention, there is provided a disk control mechanism which is characterized by adding to the disk control mechanism according to the first, the fourth, or the fifth aspect of the invention mode setting means for setting the disk apparatus to the log mode or to the non-log mode upon receipt of the transition setting instruction to the log mode or the non-log mode from the host device, the means allocating at least the original region of the original region, the log mode and the log control region allocated in the log mode at the time of the transition to the normal mode, dividing the memory region including the original region allocated in the normal mode at the time of the transition to the log mode to allocate a new original region for the log mode, the log region and the log control region, and, at the same time, allowing the rearrangement means to be provided with batch rearrangement means.

In such a structure, the memory region of the disk apparatus can be effectively used and, and can also correspond to an increase and a decrease in (the memory region of) the disk apparatus. However, since there may arise a case in which the data must be discarded with the transition of the mode, such structure may be suitable to a system which is fixed and operated to a mode after the transition, but is not suitable to a system in which the mode is frequently changed over.

Furthermore, by using a plurality of computers having a disk control mechanism according to either the third or the fifth aspect of the invention, the computer system is constituted wherein the disk apparatus is shared by using each one of the plurality of computers. In such a case, even when the computer (the primary computer) which is being operated is damaged or comes to a halt, the forward index is recovered with the recovery processing means of the disk control mechanism at the time of the start-up in a different computer (a secondary computer) which inherits the processing of the computer with the result that index can be easily inherited without using the non-volatile memory and a high availability system (a fail-over system) can be realized.

Incidentally, the present invention which is concerned with the disk control mechanism can be established as an invention which is concerned with a disk control method.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 14 is a flowchart for explaining an operation at the ON time of the power source of the disk driver 12" in FIG. 12.

DETAILED DESCRIPTION OF THE INVENTION

Figure 1:
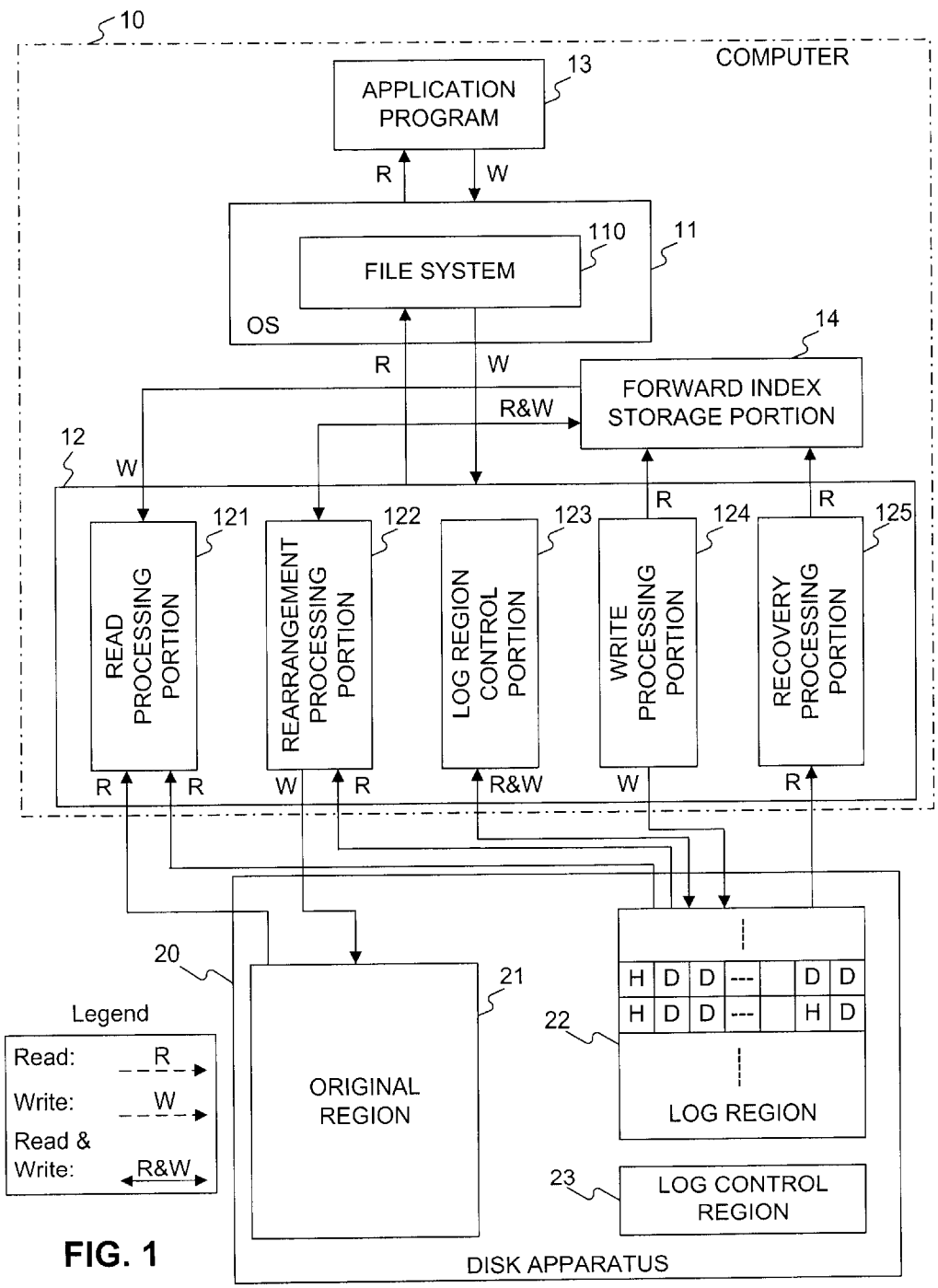
FIG. 1 is a block diagram showing a structure of a computer system according to a first embodiment of the present invention.

Embodiments of the present invention will be explained by referring to the drawings hereinbelow.

First Embodiment

FIG. 1 is a block diagram showing a structure of a computer system according to a first embodiment of the present invention.

In FIG. 1, to a computer 10 which constitutes the center of the computer system, a disk apparatus 20 represented by the magnetic disk apparatus is connected. To the disk apparatus 20, the LFS (log structured file system) is applied under the control of the computer 10.

A presupposition for an effective action of the LFS, namely the presupposition for the realization of an increase in the speed of the random write with respect to the disk apparatus 20 by the application of the LFS is that the large block sequential write with respect to the disk must be very high in speed as compared with the small block random write as has been described in the description of the prior art. In actuality, this condition can be applied to most of the disk apparatus. In particular, in the stripe set added with parity in the disk array such as a RAID 5 (Redundant Arrays of Inexpensive Disks 5), this property becomes very strong so that the present invention which is presupposed on the application of the LFS is very effective.

The memory region of the disk apparatus 20 is controlled through the division of the region into three regions: the original region 21, the log region 22 and the log control region 23. The original region 21 is used to store data in correspondence to the position designated by the computer 10, namely the original position. The log region 22 is used to store data in correspondence to the log position. The log control region 23 is used to store the control information of the log.

Here, the allocation of the region in the memory region of the disk apparatus 20 is compared with the prior art. In the beginning, in the prior art in which the random write access is not increased in speed, namely, the LFS is not applied, only the region corresponding to the original region 21 is present. On the other hand, in the prior art in which the random write access is increased in speed (the LFS is applied) in the same manner as the embodiment, only the region corresponding to the log region 22 is present. On the other hand, a first feature of the first embodiment lies in the fact that a structure is applied wherein both of the original region 21 and the log region 22 are present in the memory region of the disk apparatus 20 at the same time, and the log control region 23 is present in addition to them.

Figure 2:
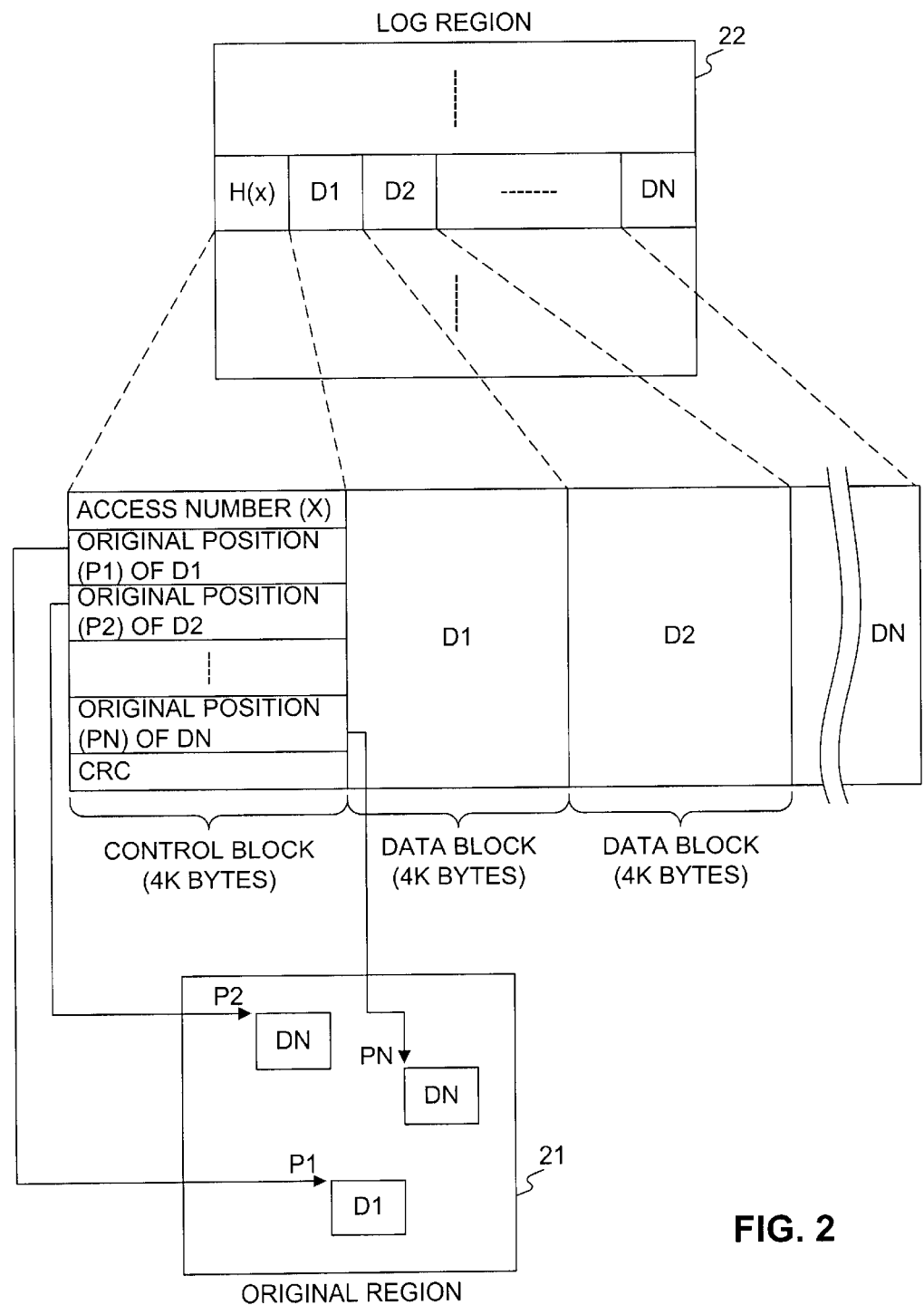
FIG. 2 is a view showing a storage form of a control block (H) and a data block (D) (as a unit block) in a log region 22 in FIG. 1 and data structure example of the control block (H) in correspondence to the original position on the region 21.

In the log region 22, a kind of a cyclic buffer (a ring buffer) structure is applied wherein unit blocks having a predetermined size (for example, 4096 bytes, namely 4 K bytes) are controlled in such a manner that the unit blocks are connected in a ring-like queue. As shown in FIG. 2, there are provided two kinds of unit blocks: data blocks (D) for storing data and control blocks (H).

As shown in FIG. 2, in the control block (H), there is stored information including an access number located at the front of a plurality of continuous data blocks to be added in a serial manner to a queue of the plurality of data blocks (D), the number of the data blocks (D) (data block number), and the original position (P) of each of the data blocks (D) and a CRC (cyclic rebundant code) for examining whether or not the control block (H) is broken. Since the control block (H) and a plurality of data blocks (D) corresponding to the control block (H) continue to each other, data can be collectively written on the log region 22 at the time of writing data. Here, the plurality of data blocks (D) controlled by the control blocks (H) continue to each other, and the size of the blocks including the control block (H) is definite (4 K bytes) with the result that the log position of the data block (D) can be easily determined on the basis of the information on the block size and the number of the blocks within the control block (H). Consequently, it is possible to say that information (a reverse index) which shows a correspondence relationship from the log position (the position on the log region 22 of the data block (D)) to the original position is preserved in the control block (H) with respect to each of the data blocks (D) controlled by the control block (H). Consequently, in the forgoing explanation, the data block is handled in such a manner that the information on the reverse index is preserved in the control block (H).

Figure 3:
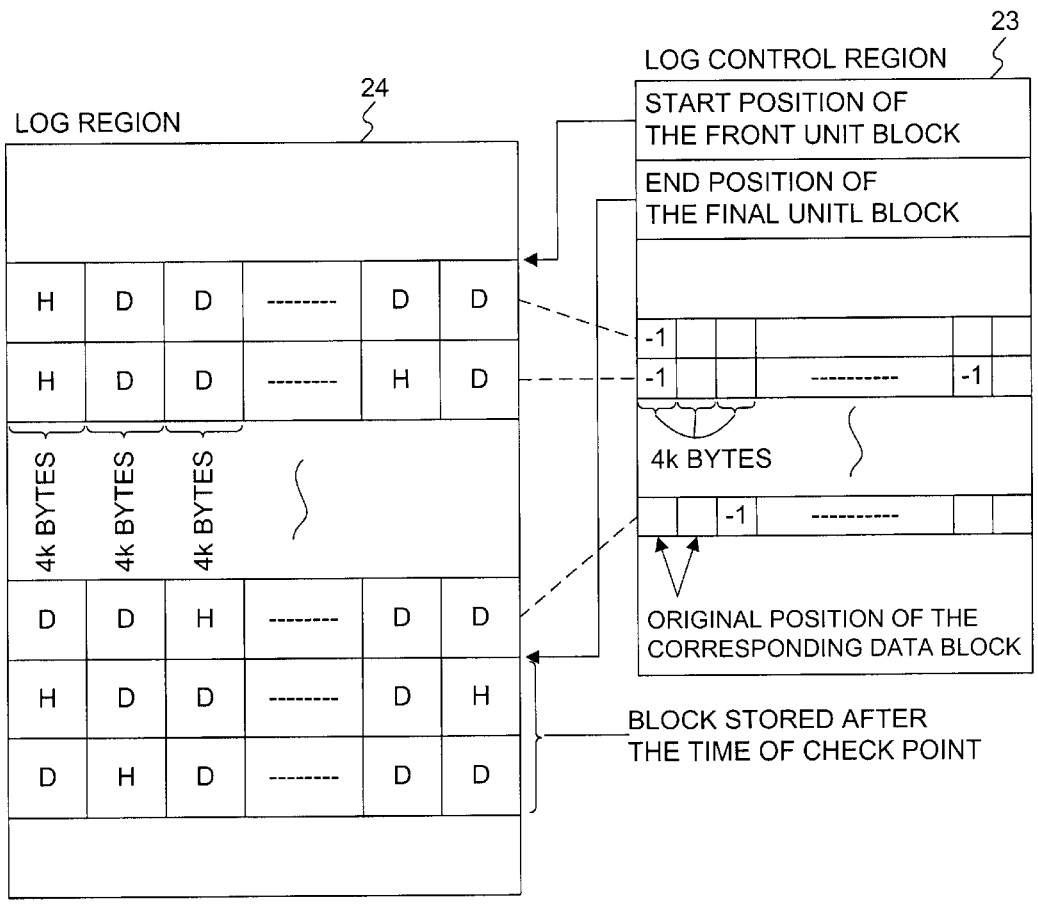
FIG. 3 is a view showing a data structure example of the log control region 23 in FIG. 1 in correspondence to the unit block on the log region 22.
Figure 4:
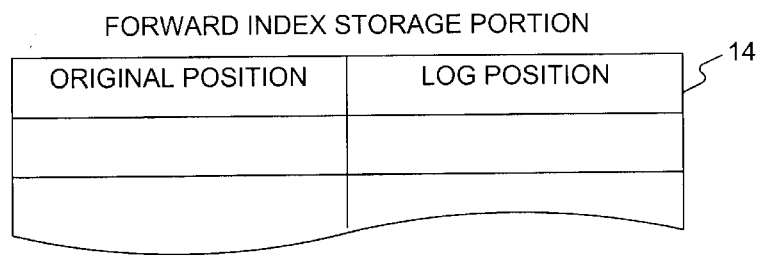
FIG. 4 is a view showing a data structure example of the forward index storage portion 14 in FIG. 1.

As shown in FIG. 3, at a certain point of time, the log control region 23 stores information which includes the start position of the front block (the start position of the front unit block), the end position of the final block (the end position of the final unit block), and the original position of each of the unit blocks of the unit blocks which is continuously stored in the log region 22. In other words, in the log control region 23, information is held and controlled which shows the storage state of the unit blocks on the log region 22 at a certain point of time. However, with respect to the control block (H) of the unit blocks, specific information (for example, information showing −1) showing that the block is the control block is used instead of the information on the original position. Incidentally, in the log control region 23, four byte region is allocated per one unit block in the log control region 23. In this case, the size of the region except for the information region at the start position of the front unit block of the log control region 23 and at the end position of the information region of the original position of the each unit block corresponds to the 4/B reduced size of the log region 22 when the size of the unit block is set to B (=4k bytes).

The log control region 23 does not necessarily hold the most recent state of the log region 22 at all times. The held contents are updated at a certain degree of time interval. The updated point of time is referred to as a check point. The update operation of the held content of this log control region 23 has an effect of completing soon the recovery operation which will be described later.

By the way, the total number n of the unit blocks which are controlled by the log region 22 can be easily calculated through the N/B calculation on the basis of the size N of the log region 22 and the block size (4k bytes). Furthermore, the log position of the i-th unit block (the position in the log region 22) can be easily calculated from the calculation of (i−1)*B on the basis of the block size B and i. This fact is equivalent to the fact that information on the log position is controlled for each of the unit blocks in the same manner as the information on the original position in the log control region 23. That is to say, it is possible to say that information showing the correspondence relationship, from the log position to the original position; namely, the reverse index is preserved in the log control region 23 with respect to each of the unit block which is stored in the log region 22 at the time of the check point. (However, the control block (H) is excluded.) Consequently, in the forgoing explanation, the data is handled in such a manner that information on the reverse index is held in the log control region 23. Incidentally, information pair of the log position and the original position maybe held for each of the unit blocks on the log control region 23, but the required region is approximately doubled.

In this manner, the second feature of the first embodiment is that in the first embodiment, information showing the original position of the unit block stored in the log region 22, namely, the reverse index is held both in the control block (H) stored in the log region 22 and in the log control region 23.

Referring to FIG. 1 again, the computer 10 is provided with an operating system (hereinafter referred to as OS) 11, a disk driver 12 constituting a disk control mechanism which is directly concerned with the present invention, and a forward index storage portion 14.

The OS 11 constitutes a core of the computer 10, and commands the system control such as the file control, the memory control, the task control, the device control or the like. The function which commands the file control in the OS 11 is referred to as file system 110. Here, the file system 11 conducts the control of files stored in the disk apparatus 20.

The disk driver 12 is located between the file system 110 of the OS 11 and the disk apparatus 20, and constitutes a disk control mechanism for controlling the data input and output with the disk apparatus 20 upon receipt of the disk access request (a disk write request and a disk read request) from each kind of application program 13 sent via the file system 110. Here, the application program 13 is one which conducts processing which is requested on the small block random write in a parallel manner. This kind of application program 13 is applied in a system in which the computer system of FIG. 1 uses the data base middle ware.

The disk driver 12 is provided with a read processing portion 121, a rearrangement processing portion 122, a log region control portion 123, a write processing portion 124, and a recovery processing portion 125.

The read processing portion 121 has a function of reading data either from the log region or from the log control region 23 in accordance with the read request from the application program 13 given via the OS 11. The rearrangement processing portion 122 has a function of rearranging the data stored in the log region 22 (specifically, the oldest effective data block (D) at the point of time) on the original position on the original region.

The log region control portion 123 controls the data stored in the log region 22 by utilizing the log control region 23. The write processing portion 124 has a function of storing the specified data in the log region 22 irrespective of the original position, depending on a write instruction from the application program 13 given via the OS 11. The recovery processing portion 125 has a function of recovering on the forward index storage portion 14 the forward index showing the relationship between the original position of the data stored in the log region 22 and the position on the log region 22 on the basis of information (a reverse index) of the log region 22 and the log control region 23 at the time of the ON of the power source of the system.

The forward index storage portion 14 is used to store an index (a forward index) showing a relationship between the original position of the effective data block (D) stored in the log region 22 and a position on the log region 22 (a log position). In the first embodiment, the forward index storage portion 14 is realized by allocating a predetermined region on the main memory (not shown).

Next, an operation in the computer system of FIG. 1 will be subsequently explained with respect to a) the recovery processing, b) the write processing, c) the log region control processing, d) the rearrangement processing and e) the read processing respectively.

a) Recovery Processing

Figure 5:
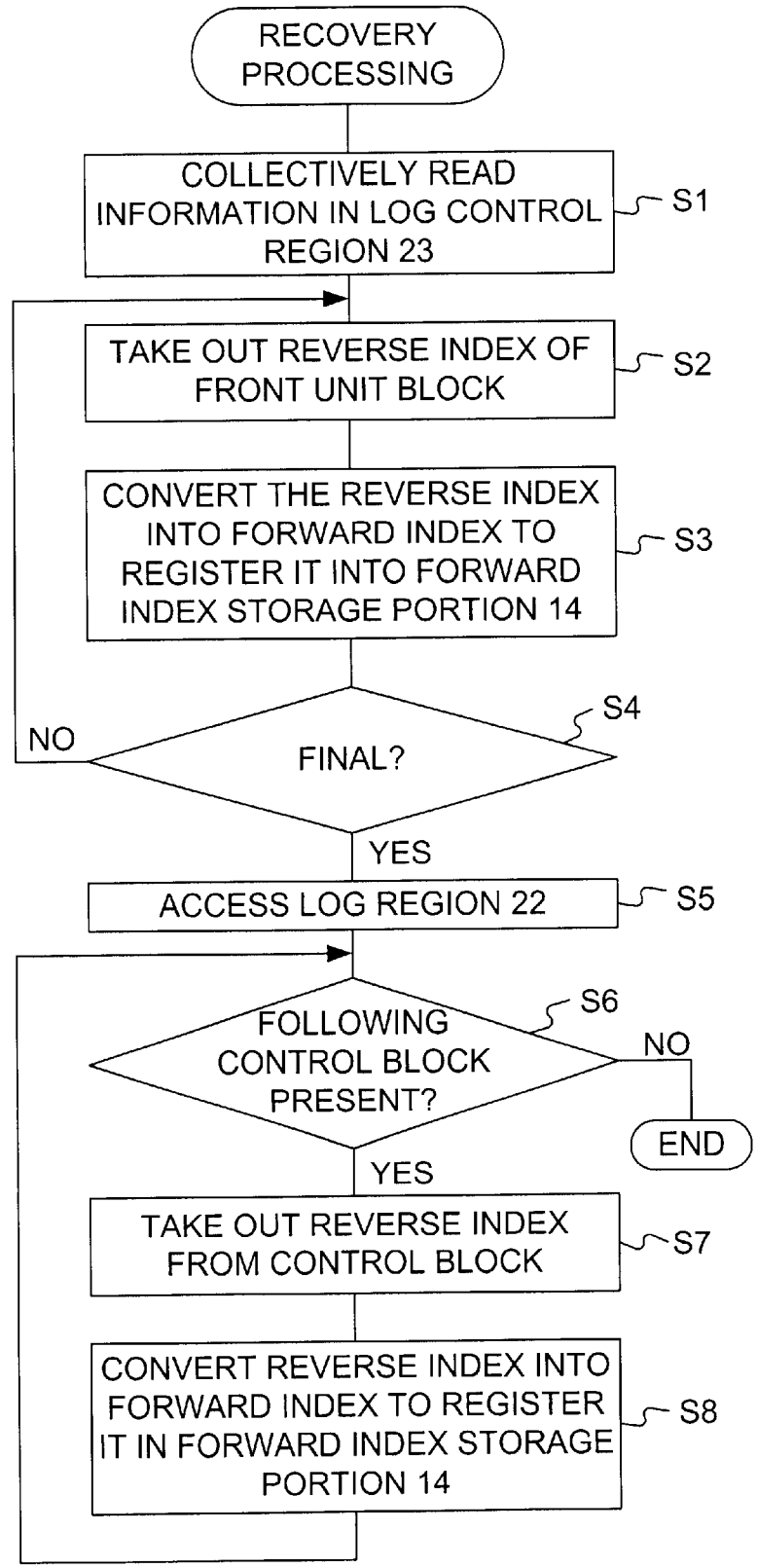
FIG. 5 is a flowchart for explaining a recovery processing by a recovery processing portion 125 in FIG. 1.

In the beginning, the recovery processing by the recovery processing portion 125 will be explained by referring to a flowchart of FIG. 5.

When the disk driver 12 of the computer 10 is started up, the recovery processing portion 125 in the disk driver 12 collectively reads information in the log control region 23 into the log control region buffer (not shown) (secured, for example, on the main memory not shown) (step S1, From the information which is subsequently read in the log control region 23, the reverse index information of each unit block (in the range from the start position of the front unit block to the end position of the final unit block) which is stored in the log region 22 at the time of the check point is taken out in order from the front unit block and is subsequently registered in the forward index storage portion 14 by exchanging the front and back of each of the reverse index information (the log position and the original position) (steps S2 and S3). Here, the control block (H) is excluded from the object of registration. In this control block, −1 is used instead of the original position information so that the control block can be easily identified.

The recovery processing portion 125 accesses the log region 22 on the basis of the information at the end position of the final unit block in the information on the log control region 23 which is read at step S1 when the steps S2 and S3 are ended with respect to all the unit blocks which are stored in the log region 22 at the time of the check point, and makes an examination as to whether the control block (H) of the next access number is present at the position following the final unit block in the log region 22 (step S6).

If the control block (H) of the next access number is present, the recovery processing portion 125 judges that the data block (D) is stored in the log region 22 after the time of the check point. In this case, the recovery processing portion 125 reads from the front unit block information on the reverse index of each unit block stored in the log region 22 after the time of the check point in order from all the control blocks (H) stored in the log region 22 after the time of the check point, exchanges the front and back (the log position and the original position) of information on each of the reverse index, and subsequently registers the information in the order index at the following position of the forward index storage portion 14 (the following position of the forward index registered on the basis of the reverse index read from the log control region 23) (steps S7 and S8). In this manner, the forward index is regenerated (recovered) in the forward index storage portion 14.

b) Write processing

Figure 6:
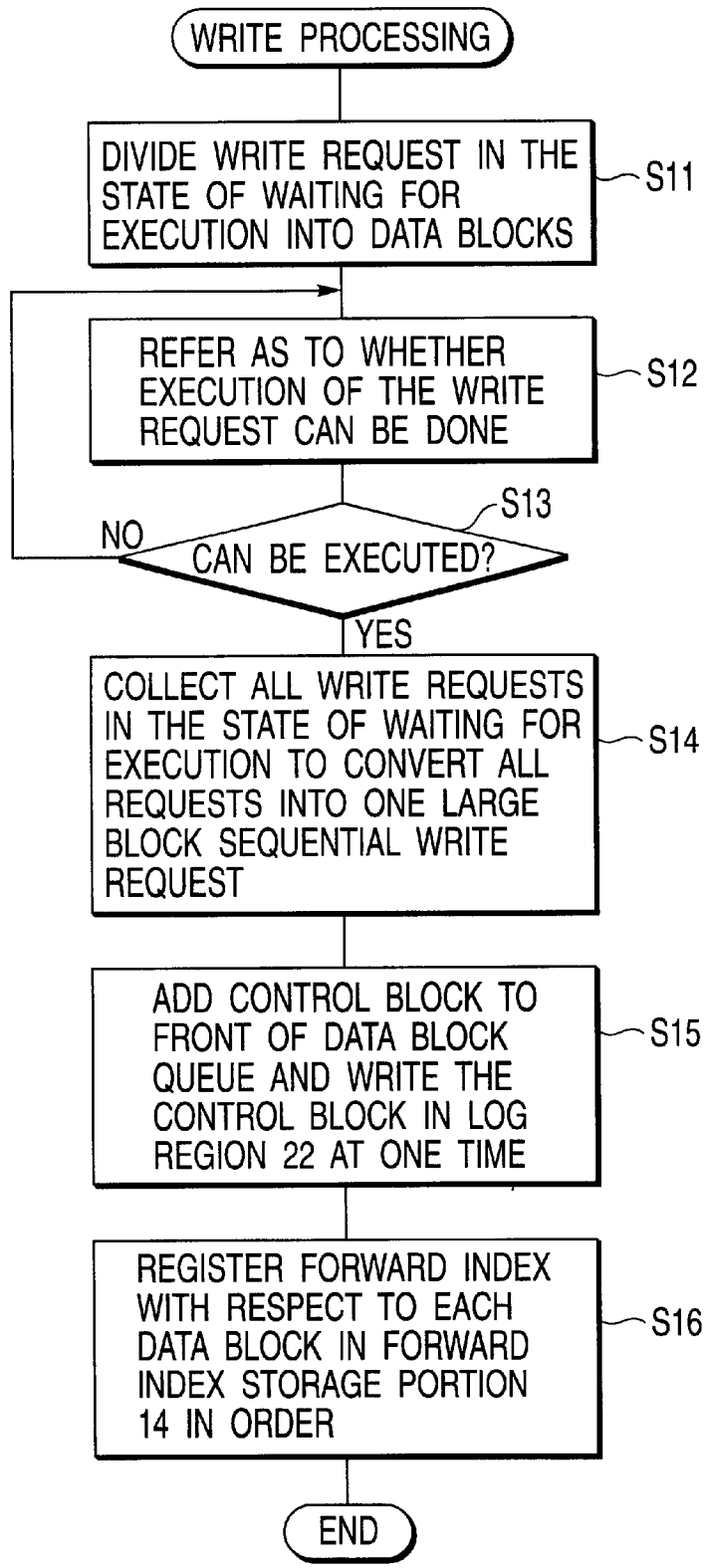
FIG. 6 is a flowchart for explaining a write processing by the write processing portion 124 in FIG. 1.

Next, the write processing by the write processing portion 124 will be explained by referring to the flowchart of FIG. 6.

When the writing request of the data to the disk apparatus 20 from the application program 13 is generated, the request is sent to the disk driver 12 via the file system 110 of the OS 11. This write request is received at the write processing portion 124 in the disk driver 12 and is connected to the final tail of the waiting queue (queue) of the write request execution. At this time, when it is supposed that the disk write is being executed, the write request is received by the write processing portion 124 during the period with the result that the execution of a new write request connected to the waiting queue of the write request execution is forced to wait.

The write processing portion 124 divides (the write data designated by) the request into data blocks (D) having logically definite sizes with respect to all the waiting queues of the write request execution, for example, at the time point when the execution of the new write request is enabled (step S11). Next, the write processing portion 124 notifies of the log region control portion 123 the log position and the original position of each data block (D) to makes a reference as to whether the execution of the write request can be done (step S12). Here, the write start position of the front data block (D) becomes the position next to the final position of the previous writing.

The log region control portion 123 adds the information on the reverse index to the log control region buffer when the original position and the log position of each of the data blocks (D) which have been completed in writing from the write processing portion 124 are notified.

By the way the log region control portion 123 constantly obtains the log position of the oldest effective data block (D) on the log region 22. As a consequence, the log region control portion 123, upon receipt of an inquiry as to whether the execution of the write request is done from the write processing portion 124, makes an examination as to whether or not there is a possibility that the position on the log region to which data block is written with the write processing portion takes over the oldest effective data block (D) position at the point of time. When there is a possibility that the position to be written takes over the oldest effective data block (D), the write processing portion (D) is forced to wait for the execution of the write request. On the other hand, when there is no such possibility, the log region control portion 123 provides a writes permission to the write processing portion 124. Incidentally, the acquisition of the oldest effective data block by the log region control portion 123 will be described later.

When a write permission is given from the log region control portion 123 (step S13), the write processing portion 124 collects each of the write requests (the small block random write request) which has been subjected to the allocation to the data block (D) and converts the requests to one large block sequential write request (step S14). Then, the write processing portion 124 collects into one the execution processing of the large block sequential write request in an order of the write request to which each of the data block divided at step S13 corresponds and in an order of the block division, and adds the control block (H) to the front thereof to execute the writing operation to the log region 22 at one time (step S15).

Thereafter, the write processing portion 124 registers in order a forward index comprising information pair from the original position of the data block to the log position in the forward index storage portion 14 with respect to each of the data block (D) written in the log region 22 (step S16). At this time, when the forward index already having the same original position information is already registered, the log position information in the forward index is updated to information on the new log position.

c) Log Region Control Processing

Figure 7:
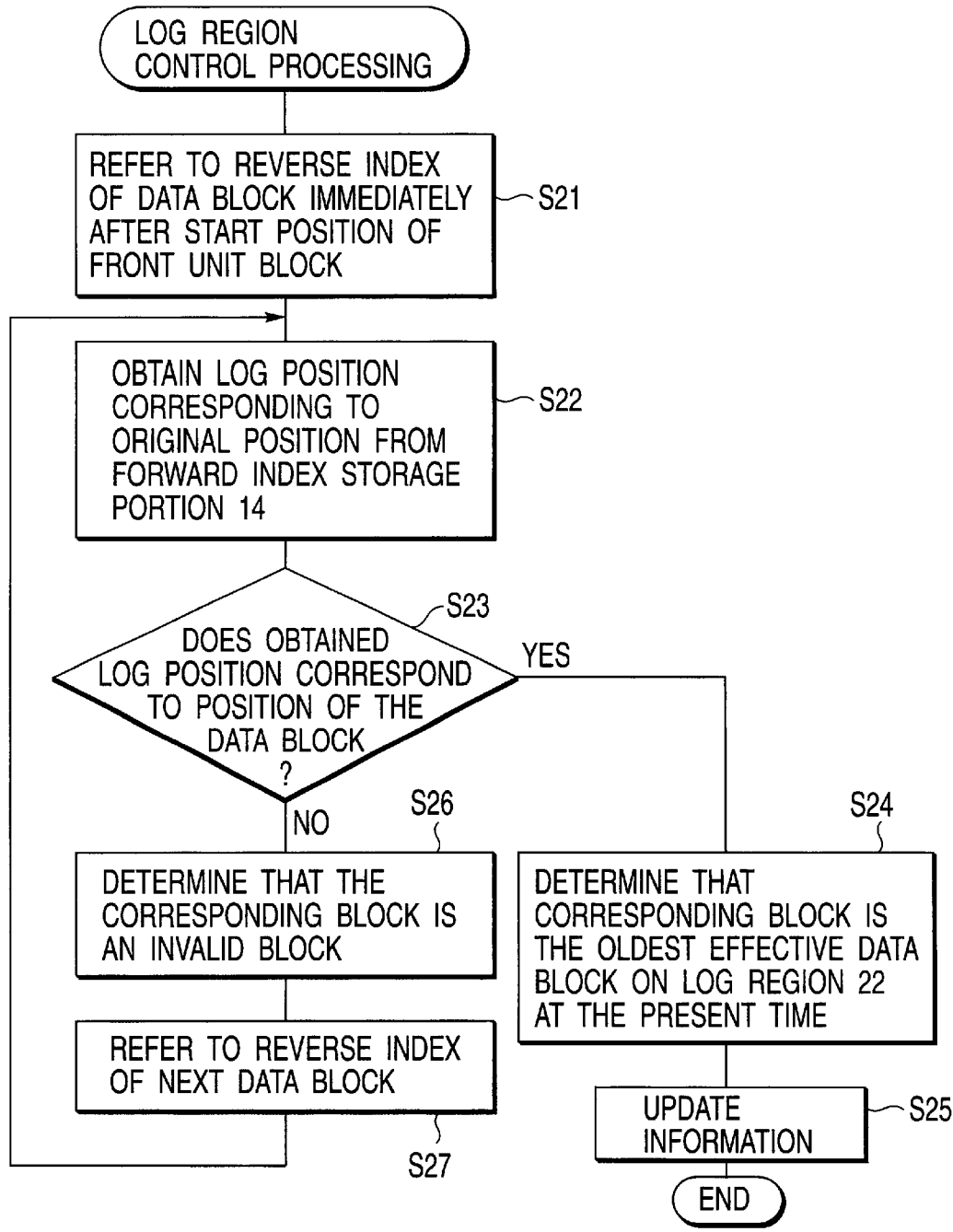
FIG. 7 is a flowchart for explaining a log region control processing by the log region control portion 123 in FIG. 1.

Next, the log region control processing by the log region control portion 123 will be explained by referring to the flowchart of FIG. 7.

The log region control portion 123 detects the position of the oldest effective data block (D) on the log region 22 in a manner described later.

In the beginning, the log region control portion 123 refers, from the log control region buffer, to the reverse index of the data block (D) immediately after the start position of the front unit block, namely, the data block (D) located at the front within the range from the start position of the front unit block to the end position of the final unit block (step S21). Next, the log region control portion 123 retrieves from the forward index storage portion 14 the log position corresponding to the original position within the reverse index which has been referred to (step S21).

If the obtained log position agrees with the log position of the data block (step S23), the log region control portion 123 determines that the data block (D) is the oldest effective data block (D) on the log region at the present time, and the information on the original position in the reverse index which has been referred to at the previous time is information showing the position of the oldest effective data block (step S24). In this case, the log region control portion 123 updates the information on the log position and the original position of the oldest effective data block (D) at the present time which information is controlled by itself (step S25).

On the other hand, when the forward index is not present, or when the obtained log position does not agree with each other (step S23), the log region control portion 123 determines that the data block is an ineffective data block (step S26). In this case, the log region control portion 123 refers to the reverse index of the next data block (D) (step S27), and returns to the processing at step S22 in order to determine whether or not the data block (D) is the oldest effective data block (D) at the present time.

The log region control portion 123 constantly obtains the log position of the oldest effective data block (D )on the log region 22 by performing the processing along with the rearrangement processing by the rearrangement processing portion 122.

Next, the update processing of the information on the log control region 23 by the log region control portion 123 will be explained.

The log region control portion 123 updates the information on the log control region buffer on the basis of the information pair on the log position and the original position for each of the data blocks (D) which is received from the write processing portion 124. As a consequence, in the log control region buffer, four byte information (−1 in the case of the control block (H) and the original position information in the case of the data block (D)) is added and registered respectively with respect to each of the plurality of blocks written on the log region 22 from the previous update time point (the previous check point time point) up to the present.

The log region control portion 123 collects and writes out the updated information on the log control region buffer on the log control region 23 in a periodic manner. The time point becomes the point of time of the check point. At the same time, information on the end position of the final unit block is rewritten in such a manner that the information shows the most recent position. At this time, the information on the start position of the front block is also rewritten in such a manner that the information shows the most recent position. The start position of this most recent front unit block is the start position of the control block (H) which is added to the data block queue including the oldest effective data block at that point of time.

d) Rearrangement Processing

Next, the rearrangement processing by the rearrangement processing portion 122 which is directly concerned with the present invention will be explained by referring to the flowchart of FIG. 8.

The rearrangement processing portion 122 conducts the rearrangement processing which will be described 1) in the case where the load of the disk apparatus is relatively small (in the case where the load is not more than the reference load), and 2) in the case where the position on the log region 22 to which the data is written by the write processing portion 124 is very likely to take over the position of the oldest effective data block (D) at that time point (in the case where the difference between the two positions is not more than the reference block number).

By the way, the rearrangement processing portion 122 refers the oldest effective data block (D) to the log region control portion 123 of the data block (D) stored in the log region 22 at that point of time when the state (1) or (2) is generated (steps S31 or S32) to read the data block from the log region (step S33). Then, the rearrangement processing portion 122 writes the read data block (D) in the original position of the original region 21 (step S34).

Next, the rearrangement processing portion 122 eliminates the forward index with respect to the data block (D) which becomes an object to be written at step S32 from the forward index storage portion 14 (step S35).

e) Read Processing

Next, the read processing by the read processing portion 121 will be explained by referring to the flowchart of FIG. 9.

When the read request for reading data to the disk apparatus 20 from the application program 13 is generated, the request is sent to the disk driver 12 via the file system 110 of the OS 11. This read request is received with the read processing portion 121 in the disk driver 12.

Then, the read processing portion 121 divides (read object data designated by) the received read request into the data block (D) unit (step S41). Then, the read processing portion 121 retrieves the forward index having (the information of) the original position which agrees with the original position of the front data block which becomes a read object on the forward index storage portion 14 (step S42).

If the object forward index can be retrieved (step S43), the read processing portion 121 reads the data block (D) from the log region 22 on the basis of the information on the log position in the forward index which could have been retrieved (step S44). On the other hand, if the object forward index could not have been retrieved, the read processing portion 121 conducts the processing of reading the data block from the original region 21 on the basis of the information on the original position (step S45).

When the read processing portion 121 reads the object data block (D) from the log region 22 or from the original region 21, the read processing portion 121 checks as to whether the process up to the reading of the final data block (D) designated by the read request has been ended (step S46).

If the process up to the reading of the final data block (D) designated by the read request is not ended, the reading processing portion 121 conducts the processing of retrieving the forward index having the next data block (D) to be a reading object, namely the processing which is similar to the processing at step S42, and returns to the step S43.

In this manner, when all the data block constituting the data designated by the read request is completely read from the log region 22 or from the original region 21 (step S46), the read processing by the reading processing portion 121 is ended.

Incidentally, the read processing portion 121 checks as to whether the data block which constitutes an object of reading continues either on the log region 22 or the original region so that a continuous data block (D) queue may be read out from the log region 22 or from the original region 21 at one time.

The first embodiment of the present invention will be explained hereinbelow. According to the first embodiment of the present invention, an effect which will be cited hereinbelow can be obtained.

(1) Since the reverse index is preserved both in the control block (H) stored in the log region 22 and in the log control region 23, an index showing a correspondence relationship between the original position and the log position can be completely recovered in the forward index storage portion 14 through the recovery processing on the basis of the inverse index by the recovery processing means portion 125. Consequently, the non-volatile memory such as an NVRAM or the like becomes unnecessary.

(2) Since a plurality of small block random writes are converted into large block sequential writes at the write processing portion 124, an increase in the speed in the disk writing can be realized.

(3) Since the data block (D) written at a high speed on the log region 22 by the write processing portion 124 is rearranged to the original position within the original region 21 by using the time when the disk apparatus 20 is empty, namely, the period in which the load of the disk apparatus 20 is relatively small, the compensation generated by the conversion of the written position is eliminated and a reduction in the read performance can be prevented (in order to increase the speed of data writing designated by the small block random write) while attempting a load distribution of the time direction.

(4) The data which constitutes an object of rearrangement is set as the oldest effective data block (D), and the period of rearrangement is likely to take over the position of the data block (D) with the result that the data which is not overwritten (not updated) at the original position during the period in which the writing to the log region 22 by the write processing 124 goes around approximately the whole circumference of the log region 22, namely the data which is not overwritten after that process is rearranged at the original region 21 thereby preventing the reduction in the read performance thereof. This fact means that there is provided an effect of differentiating the data block which is relatively frequently rewritten from the data which is not overwritten in the case where the high load state continues for a long time.

(5) Since the forward index storage portion 14 may only hold the data block (D) stored in the log region 22, the memory region (the memory capacity) allocated to the forward index storage portion 14 can be made small as compared with the prior art.

Second Embodiment

Figure 10:
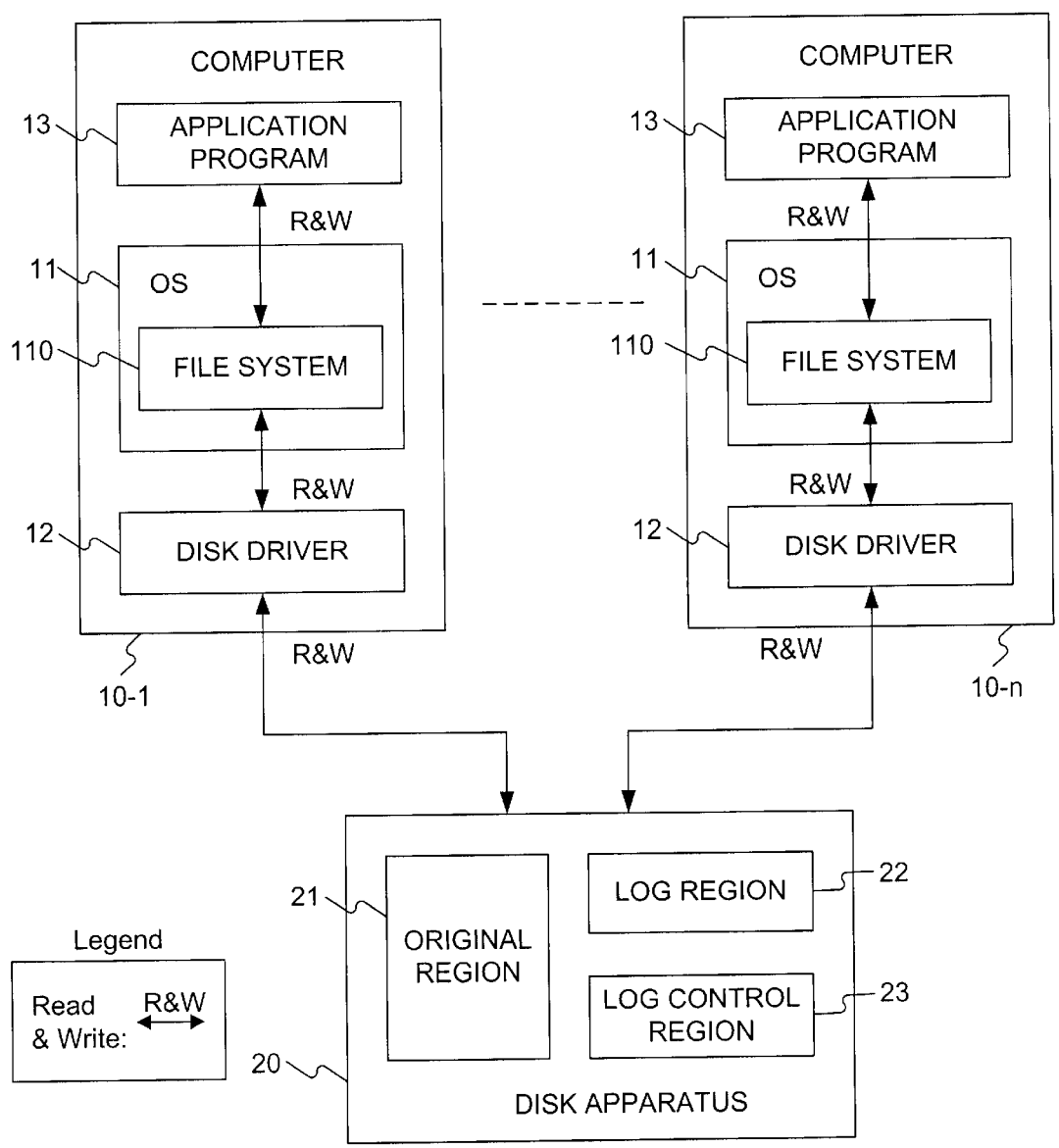
FIG. 10 is a block diagram showing a structure of a computer system according to a second embodiment of the present invention.

FIG. 10 is a block diagram showing a structure of a computer system according to a second embodiment of the present invention. Like portions in FIG. 1 are denoted by the like reference numerals.

The computer system of FIG. 10 comprises a plurality of computers 10-1 through 10-n (corresponding to the computer 10 of FIG. 1), a disk apparatus 20 which is shared by each of the computers 10-1 through 10-n. The disk apparatus 20 can be assessed from any of the computers 10-1 through 10-n. The memory region is controlled by being divided into the original region 21, the log region 22, and the log control region 23 in the same manner as the first embodiment.

Each of the computers 10-1 through 10-n is provided with the OS 11 having the file system 110 and the disk driver 12 in the same manner as the computer 10 of FIG. 1. Furthermore, on each of the computers 10-1 through computers 10-n, the same application program 13 is arranged. Incidentally, though omitted in FIG. 10, (the region of) the forward index storage portion 14 is also provided on each of the computers 10-1 through 10-n.

In the system of FIG. 10, what is operated at a certain point of time of the application program 13 on each of the computers 10-1 through 10-n is restricted to the application program 13 on any one of the computer 10-i (a primary computer at that point of time).

Such a computer system is referred to as an HA system (high availability system). The feature of the HA system lies in the fact that even when the computer 10-i wherein the application program is operated comes to a halt due to trouble, another computer 10-j (j denotes 1 through n, but j is not equal to i) can inherit the processing.

In the beginning, the disk driver 12 provided on each of the computers 10-1 through 10-n is operated in the same manner as described in the first embodiment. Consequently, when it is supposed that the computer in which the application program 13 is operated is the computer 10-1, the computer 10-1 is operated in the same manner as the computer 10 of the first embodiment, and has the same effect as the computer 10.

By the way, it is supposed that when the computer 10-1 in which the application program 13 is operated comes to a halt, the computer 10-n inherits the processing thereof. In this case, the recovery processing portion 125 is started up which is provided on the disk driver 12 on the computer 10-n.

Then, the recovery processing portion 125 starts up the recovery processing (refer to FIG. 5) which is described in the first embodiment, namely, the recovery processing which is based on the reverse index which is collectively preserved in the log control region 23 at the time of the most check point, and the reverse index in the control block (H) which is preserved in the log region 22 after the time of the check point. With this recovery processing, the index of all the data blocks (D) stored in the log region 22 of the disk apparatus 20 at the time of inheritance is completely recovered so that the inheritance of the processing from the computer 10-1 to the computer 10-n can be made possible.

In the second embodiment, since the reverse index is collectively preserved for each of the check points, the reading of the reverse index can be read at a high speed. As a consequence thereof, the recovery time at the time of the inheritance of the processing between the computers can be shortened.

Third Embodiment

Figure 11:
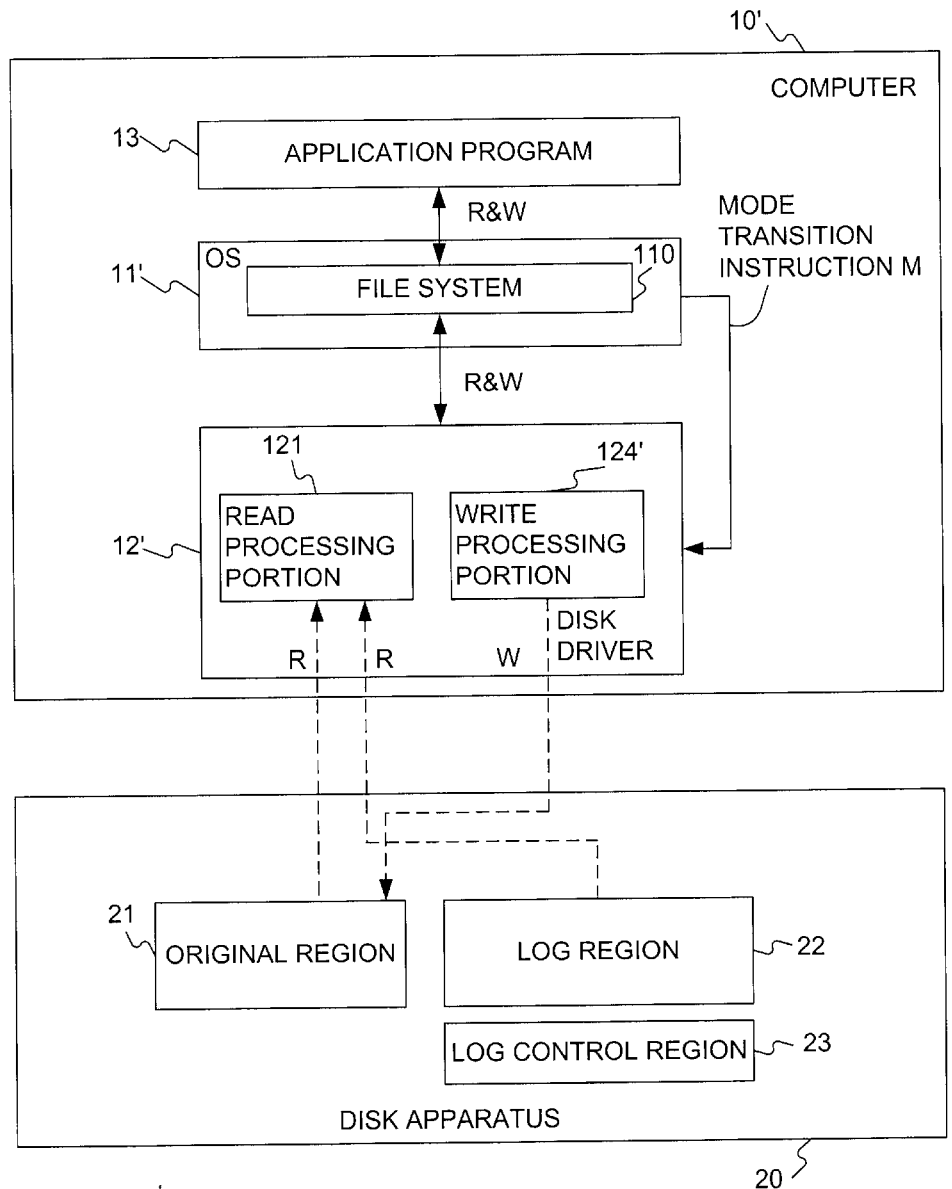
FIG. 11 is a block diagram showing a structure of a computer system according to a third embodiment of the present invention.

FIG. 11 is a block diagram showing a structure of a computer system according to a third embodiment of the present invention. Like portions in FIG. 1 are denoted by like reference numerals.

The computer system of FIG. 11 comprises a computer 10' (corresponding to the computer 10 of FIG. 1) and a disk apparatus 20 connected to the computer 10'. The memory region of this disk apparatus 20 is controlled by being divided into the original region 21, the log region 22, and the log region 23 in the same manner as the first embodiment.

The computer 10' comprises an OS 11' having a file system 110, and a disk driver 12'. The OS 11' is constituted in such a manner that, for example, a mode transition instruction M is issued to the disk driver 12' in accordance with the mode transition instruction of the operator. This mode transition instruction M gives an instruction of changing over to the log mode in which the LFS described in the first embodiment in constantly applied or an instruction of changing over to the non-log mode in which the LFS is not newly applied.

The greatest difference between the log mode and the non-log mode is such that the writing of the data designated by the write request is conducted to the log region 22 in the same manner as the first embodiment in the log mode while the writing thereof is conducted to the original region 21 in the non-log mode 21. Thus, the disk driver 12' is provided with the write processing portion 124' instead of the write processing portion 124 of FIG. 1. The structure except for the write processing 124' in this disk driver 12' is the same as the disk driver 12 of FIG. 1. However, in FIG. 11, only the read processing portion 121 is shown except for the write processing portion 124'. Other portions such as the rearrangement processing portion 122, the log control portion 123, and the recovery processing portion 125 are omitted.

Here, an operation of the disk driver 12' will be explained primarily centering on the computer system having the structure of FIG. 11.

The OS 11' issues a mode transition instruction M with respect to the disk driver 12' when the mode transition is required an operation of the operator in the operation state of the system. Then, the disk driver 12' sets to the non-log mode when the current mode is the log mode while the disk driver 12' sets to the log mode when the current mode is the non-log mode. The information showing this set mode is recorded in the predetermined position on the memory region of the non-volatile memory, for example, the disk apparatus 20. Incidentally, instead of the mode transition instruction M, the structure may be made in such a manner that the log mode ON/OFF instruction is issued which instructs the ON (log mode setting) or OFF (log mode release, namely, non-log mode setting) of the log mode irrespective of the current mode in place of the mode transition instruction M.

Now, it is supposed that the write request from the application program 13 is given to the disk driver 12' via the OS 11' in the state in which the non-log mode is set (the OFF state of the log mode, and the release state of the log mode). In this case, the write processing portion 124' within the disk driver 12' conducts the write processing in which data is written which is designated with respect to the original position in the original region 21 designated by the write request.

Figure 9:
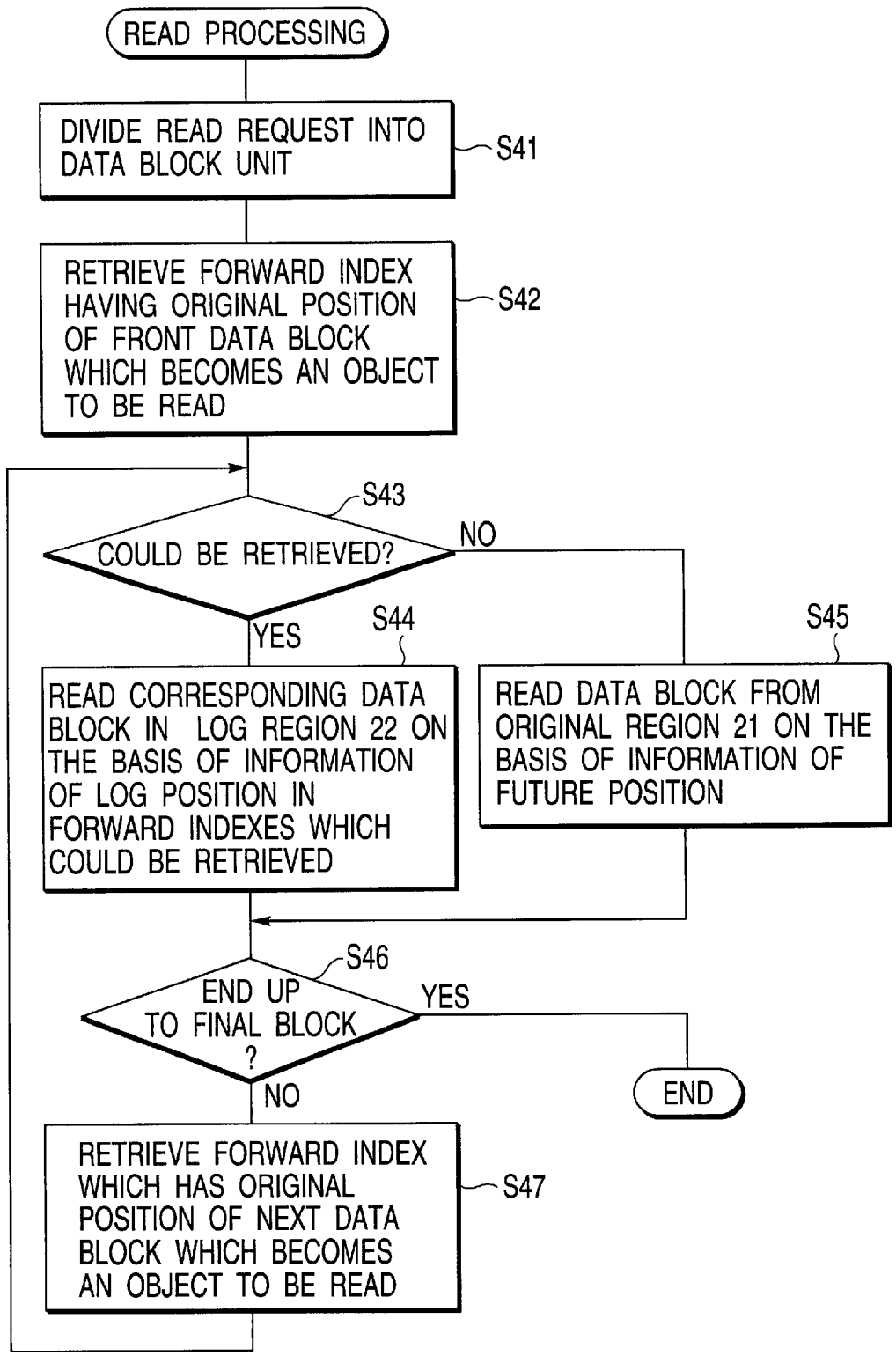
FIG. 9 is a flowchart for explaining a read processing by a read processing portion in FIG. 1.

Furthermore, in the case where the read request is given from the application program 13 in the state in which the non-log mode is set, the read processing portion 121 conducts the read processing for reading data either from the original region 21 or from the log region 22 in accordance with the flowchart of FIG. 9 in the same manner as the first embodiment.

Figure 8:
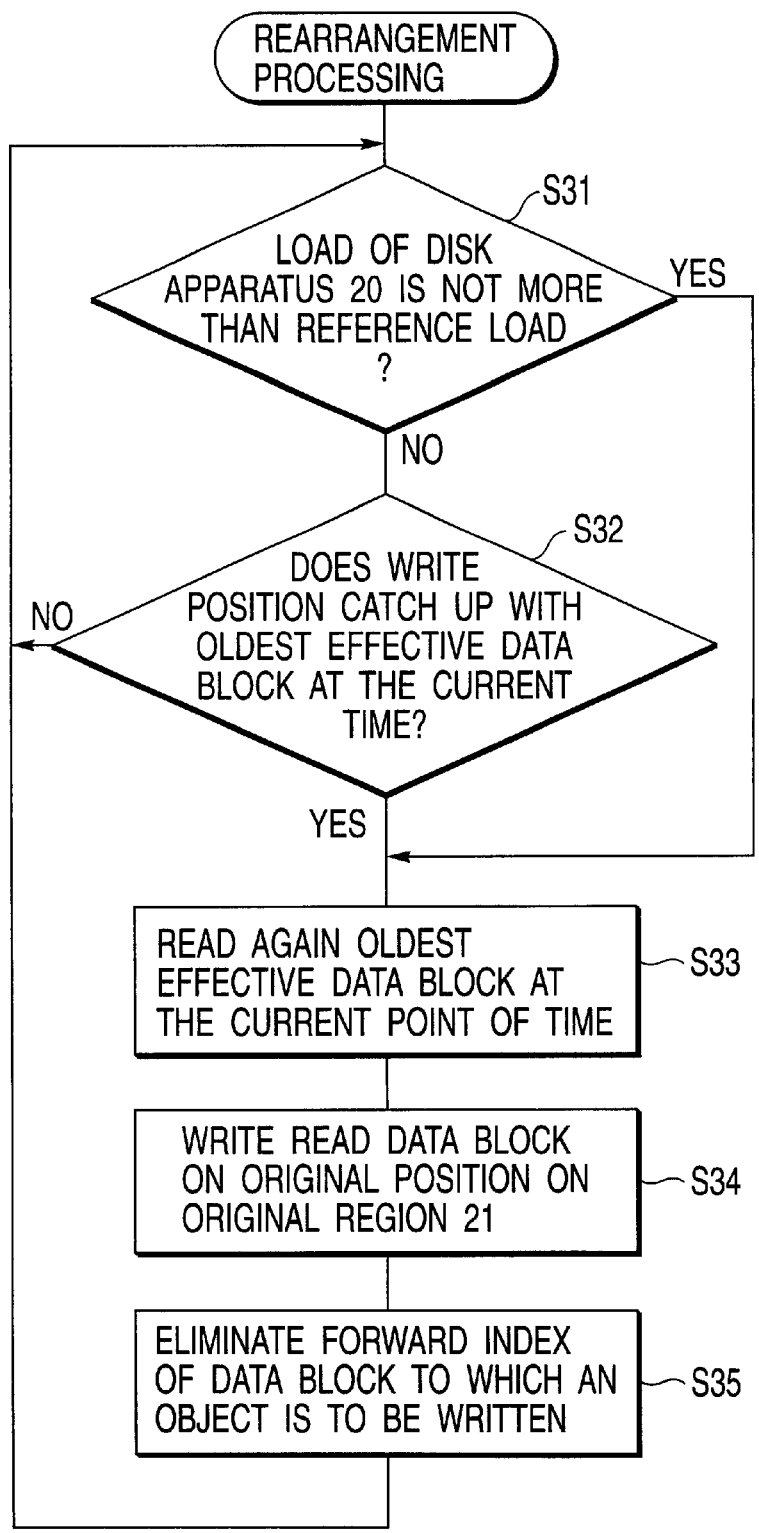
FIG. 8 is a flowchart for explaining a rearrangement processing by the rearrangement processing portion 122 in FIG. 1.

By the way, the rearrangement processing portion not shown (corresponding to the rearrangement processing portion 122 in FIG. 1) within the disk driver 12' conducts the rearrangement processing of the block unit to the original region 21 from the log region 22 which follows the flowchart of FIG. 8 in the same manner as the first embodiment irrespective of the log mode/non-log mode. Furthermore, in the non-log mode, the writing of data designated by the write request is conducted only with respect to the original region 21 as has been described above.

Consequently, in the non-log mode, the writing of data to the original region 21 continues. Furthermore, when the rearrangement processing is repeated, the effective data block (D) on the log region 22 decreases, and the state can be generated in which no effective data block (D) is soon present on the log region 22. When such a state is generated, the reading of the data is conducted only from the original region 21.

On the other hand, the operation of the disk driver 12' in the log mode is conducted completely in the same manner as the first embodiment by using the original region 21, the log region 22, and the log control region 23.

As has been described, in the third embodiment, the transition from the non-log mode to the log mode can be conducted in the state in which the data is preserved in the original region 21. Besides, the transition from the log mode to the non-log mode can be conducted in the state in which data is preserved in the original region 21, the log region 22 and the log control region 23. Here, the non-log mode is suitable to the backup processing or the like in which the large block access is made. Then, the period (for example, the business hours) when transaction processing is conducted wherein the small block access is frequently made is the time when the log mode is set, the period (for example, time except for the business hours) when the backup processing is conducted is the time when the non-log mode is set (the log mode is released), the disk access can be increased in speed at all times.

The above structure is suitable to the computer system in which the transaction processing and the backup processing are frequently (for example, every day) conducted.

Incidentally, at the time when the log mode is changed over to the non-log mode, namely, at the time when the log mode is released, the structure may be constituted in such a manner that all the effective data blocks (D) on the log region 22 are forcibly rearranged in the original region 21. When such a structure is constituted, the reading of the data by the read processing portion 121 is conducted with respect to the original region 21 at all times immediately after the transition to the non-log mode with the result that the large block sequential read is conducted at a high speed. In this structure, it is possible to mount a new disk driver (having the same function as the disk driver of FIG. 1) that is operated in the log mode and two kinds of disk drivers which are operated in the non-log mode and which are conventionally used.

Fourth Embodiment

Figure 12:
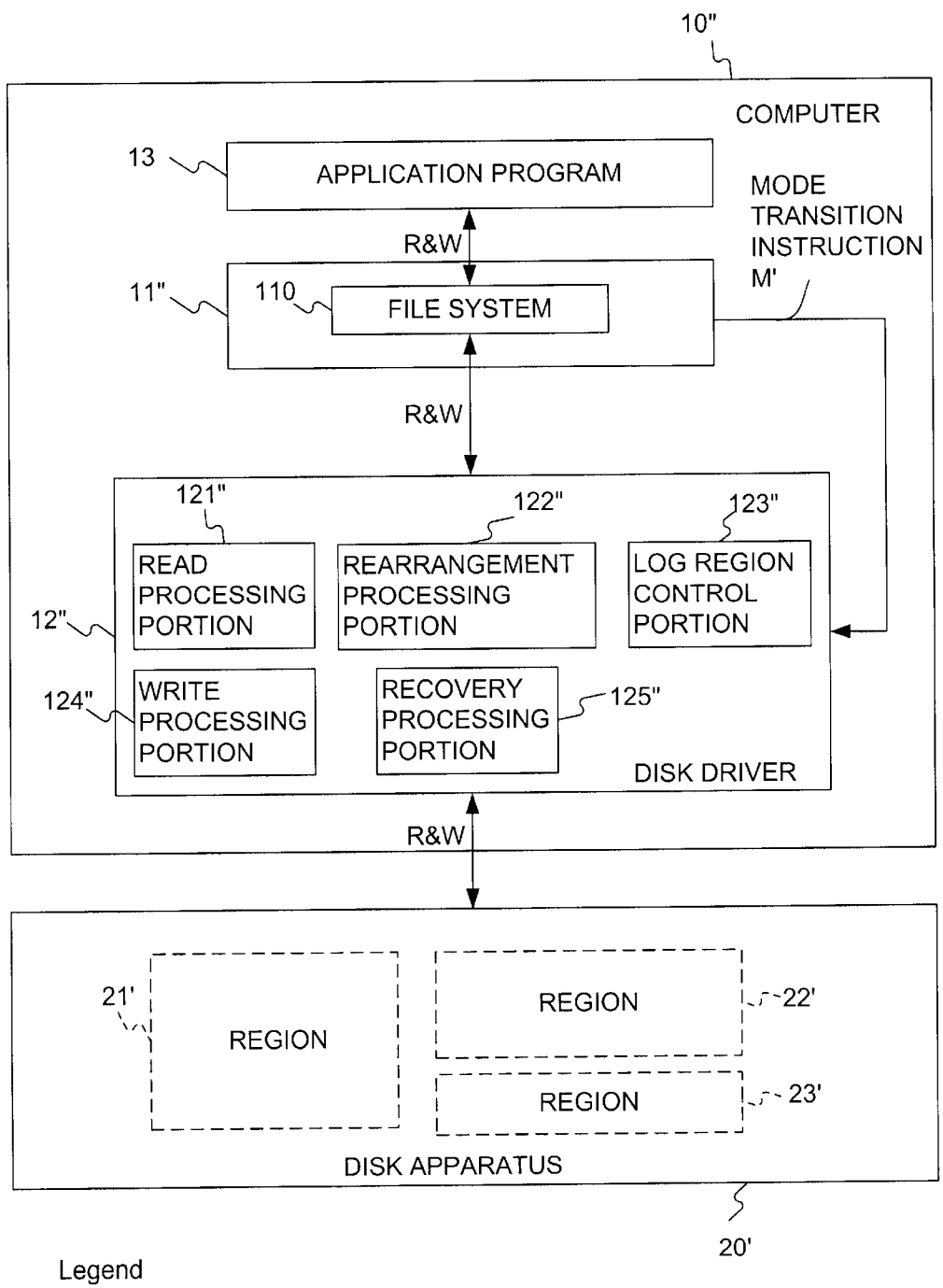
FIG. 12 is a block diagram showing a structure of a computer system according to a fourth embodiment of the present invention.

FIG. 12 is a block diagram showing a structure of a computer system according to a fourth embodiment of the present invention. Like portions in FIG. 11 are denoted by like reference numerals.

The computer system of FIG. 12 comprises a computer 10" (corresponding to the computer 10' in FIG. 11), and a disk apparatus 20' connected to the computer 10". The disk apparatus 20" can be used in any of the modes: the log mode described in the third embodiment in which the LFS is applied, and the normal mode in which the LFS is not applied.

The memory region of the disk apparatus 20' is controlled by being divided into three regions: the region 21', the region 22' and region 23' in the log mode. The region 21' is used as the original region (corresponding to the original region 21 in FIG. 11 (FIG. 1)), the region 22' is used as the log region (corresponding to the log region 22 in FIG. 11 (FIG. 1)), and the region 23' is used as the log control region respectively. On the other hand, in the normal mode, three regions such as the region 21', the region 22' and the region 23' are all used as the original region. In this respect, in the normal mode, only the region 21 in FIG. 11 corresponding to the region 21' is different from the non-log mode in the third embodiment which is used as the original region.

The computer 10" comprises an OS 11" having the file system 110, and a disk driver 12". This disk driver 12" has a read processing portion 121", a rearrangement processing portion 122", a log region control portion 123", a write processing portion 124" and a recovery processing portion 125", (corresponding respectively to the read processing portion 121, the rearrangement processing portion 122, the log region control portion 123, the write processing portion 124 and the recovery processing portion 125).

Figure 13:
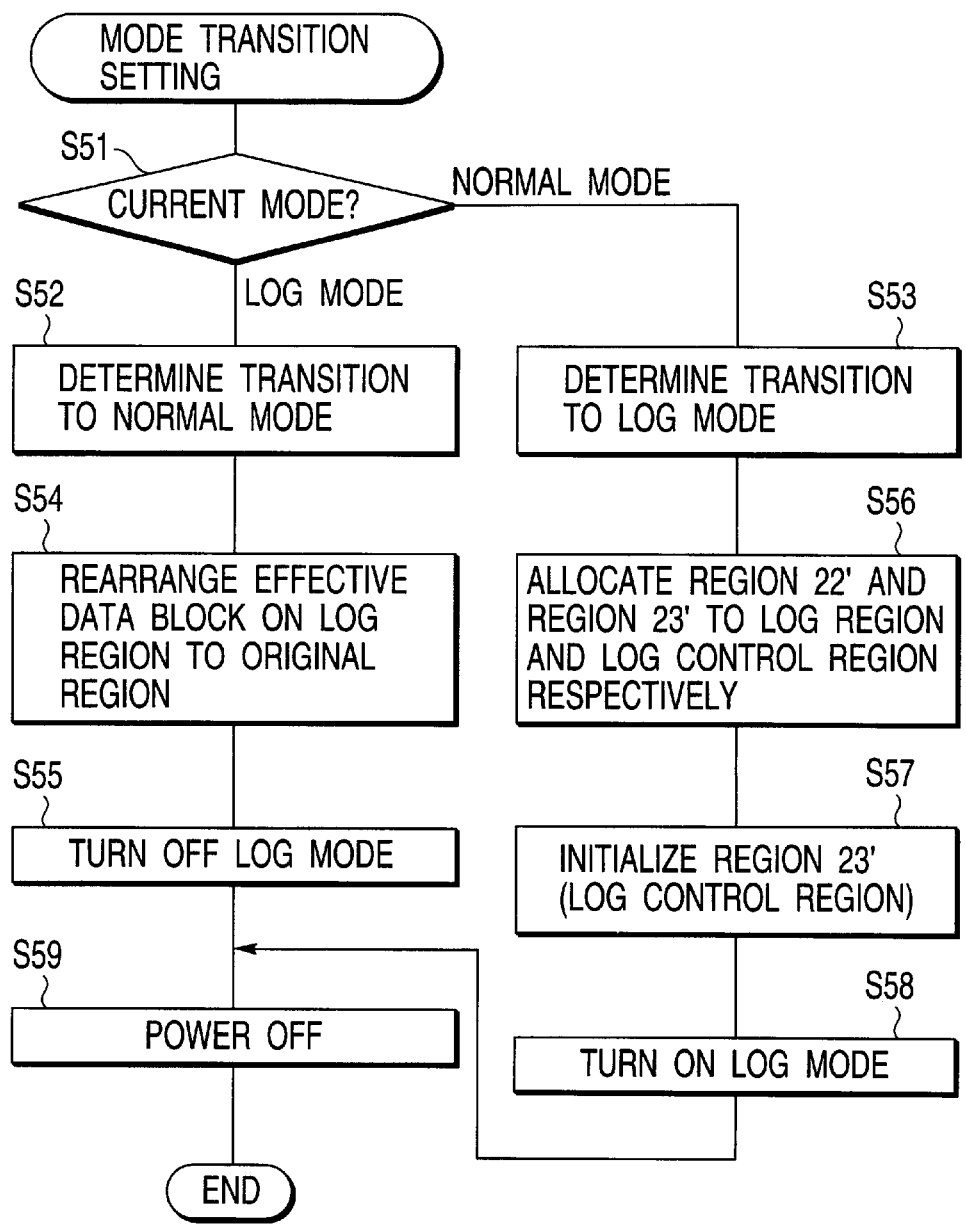
FIG. 13 is a flowchart for explaining an operation at the time of the transition mode centering on a disk driver 12" in FIG. 12.

Here, an operation of a disk driver 12" in the computer system having the structure of FIG. 12 will be primarily explained by referring to flowcharts of FIGS. 13 and 14.

The OS 11" issues a mode transition instruction M' with respect to a disk driver 12" when a mode transition is instructed with an operation by an operator in a state of a system operation. Then, the disk driver 12" examines the current mode (step S51), and determines whether or not the mode is supposed to changed over either to the log mode or to thee non-log mode (step S52 or S53).

When a transition of the mode (from the log mode) to the normal mode is determined, the disk driver 12" rearranges all the effective data blocks (D) on the region 22" allocated as the log region in the log mode to the region 21" allocated as the original region in the log mode (step S54). Next, the device driver 12" turns off the log mode to transition the mode to the normal mode. Information showing this mode is recorded on a predetermined position of a non-volatile memory apparatus, for example, on the disk apparatus 20' in such a manner that the power source of the computer 10" can be identified also at the time of the re-start-up of the after the turning off of the power source of the computer 10".

On the other hand, in the case where the transition of the mode (from the normal mode) to the log mode is determined, the disk driver 12" allocates the region 22' and the region 23' as the log region and the log control region of the three regions 21' through 23' on the memory region on the disk apparatus 20' allocated as the original region in the normal mode, and discards the content of the region (step S56). Next, the disk driver 12" initializes the region 23' allocated as the log control region (step S57). Then, the disk driver 12" turns on the log mode to transit the mode from the normal mode to the log mode (step S58).

The disk driver 12" notifies the completion of the transition of the mode setting of the OS 11" when the disk driver 12" conducts the process at step S55 or step S58. As a consequence, the OS 11" turns off the power source of the system (step S59).

After that, when the power source of the system is turned on, the disk driver 12" checks as to whether or not the log mode is set by referring to the mode information recorded on the predetermined position in the memory region of the disk apparatus 20' (step S61).

If the log mode has been set, the disk driver 12" sets the regions in such a manner that the region 21' is set as the original region, the region 22' is set as the log region and the region 23' is set as the log control region with respect to each of the regions 21' through 23' in the memory region of the disk apparatus 20'. Next, the disk driver 12" starts up the recovery processing portion 125" to conduct the recovery processing in accordance with the flowchart of FIG. 5 as has been described in the first embodiment (step S63).

Here, when the log mode has been already set at the previous ON time of the power source, the forward index is recovered in the forward index storage portion not shown (corresponding to the forward index storage portion 14 in FIG. 1) on the basis of the information of the log control region (region 23') and the log region (region 22') with the recovery processing. on the other hand, when the normal mode has been set at the previous ON time of the power source, a substantial recovery processing is not carried out because the information that constitutes an object of the recovery is not present, and the recovery processing is ended. Then, when the recovery processing is ended, the disk driver 12" is capable of starting the currently set mode, namely an operation in the log mode (step S64). The operation of the read processing portion 121", the rearrangement processing portion 122", the log region control portion 123", the write processing portion 124", and the recovery processing portion 125" in this log mode is the same as the operation of the read processing portion 121, the rearrangement processing portion 122, the log region control portion 123, the write processing portion 124 and the recovery processing portion 125.

On the other hand, when the normal mode has been set, the disk driver 12" sets all the regions in such a manner that each of all the regions 21' through 23' in the memory region of the disk apparatus 20' as the original regions (step S65). As a consequence, the disk driver 12" is capable of starting the operation in the mode which is currently set, namely, in the normal mode (step S64). In this normal mode, the operation is conducted in the same manner as the conventional disk driver in which the LFS is not applied. Only the read processing portion 121" and the write processing portion 124" conduct the read operation and the write operation which target the original regions (regions 21' through 23').

In the structure, in the normal operation, the region 22', and the region 23' are also used as the original region in addition to the region 21' with the result that the memory region of the disk apparatus (20') can be effectively used in the normal mode as compared with the third embodiment. However, at the time of the transition of the mode to the log mode, the content of the region 22' and the region 23' is discarded so that the content of the region 22' and the region 23' may well be backed up if necessary. Consequently, the structure of FIG. 12 is more suitable to the system in which the same mode is applied over a relatively long period of time than to the system in which the mode is frequently changed over.

Incidentally, in the present embodiment, an explanation is made on the basis of the presupposition that one disk driver 12" can cope with any mode even when the either of the log mode or the normal mode has been set. However, it is also possible to package two kinds of disk drivers: a disk driver which is operated in the log mode, and a disk driver which is operated in the normal mode. Furthermore, in the fourth embodiment, an explanation is made on the basis of the presupposition that one disk driver 12" can cope with any mode even when either of the log mode or the normal mode has been set. For example, at the time of the transition of the mode from the normal mode to the log mode, the disk apparatus is newly provided so that the memory region the newly provided disk apparatus is used as the region 22' for the log region and as the region 23' for the log control region. In such a structure, at the time of the transition of the mode from the log mode to the normal mode, contrary to the description, the disk apparatus having the region 22' for the log region and the region 23' for the log control region may be detached from the system.

As has been described in detail above, according to the present invention, as a result of the application of the LFS (the log structured file system) for an increase in the speed of random write, the deterioration in the performance of the large block sequential read can be prevented with the rearrangement in consideration of the original arrangement of data.

Furthermore, according to the present invention, the index can be recovered with certitude at the time of the start-up without using the non-volatile memory even when the power source shut-off is generated by effectively using the disk region for the preservation of the index necessary for the increase in the speed of the random write. As a consequence, while the non-volatile memory is not required, it becomes possible that the inheritance of the index at the fail-over system can be easily conducted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk control mechanism comprising:

means for collecting data designated by a plurality of disk write requests received from a host device to continuously store the data in a data block unit having a predetermined size on a log region which is provided separately from an original region which can be designated by the host device of a disk apparatus; and rearrangement means for repeating an operation of rearranging an oldest effective data block on the log region to a position on the original region at which an oldest effective data block is originally written.

2. The disk control mechanism according to claim 1, wherein the collecting means stores a control block which is added to a queue of the data blocks in the log region, the control block including a reverse index showing the position on the original region where each of the data blocks, which are continuously stored, is supposed to be originally written, the disk control mechanism further comprising:

recovery processing means for reading the reverse index from the control block on the log region at the time of start-up and for recovering a forward index showing a correspondence relationship between a position on the log region of the data block and a position on the original region on which the data block is supposed to be originally written from the reverse index on a forward index storage region provided on a volatile memory; and read processing means for, in the case where the read request is received from the host device, judging which of the log region or the original region the data block designated by the read request is stored by referring to the forward index storage region on the basis of the read request to read the data block corresponding to the read request either from the log region or from the original region on the basis of the judgment result thereof;

wherein the rearrangement means eliminates the forward index of the data block which is rearranged from the forward index storage region at the time of the rearrangement of the data block.

3. The disk control mechanism according to claim 2, further comprising:

mode setting means for setting the disk apparatus either to a log mode or to a normal mode upon receipt of a transition setting instruction either to the log mode or to the normal mode from the host device, wherein the mode setting means allocates the original region of the original region, the log region and the log control region allocated in the log mode at the time of the transition to the normal mode to a new original region for the normal mode, and allocates a memory region which is a divided memory region including the original region allocated in the normal mode to the new original region, the log region, and the log control region for the log mode at the time of the transition to the log mode;

wherein arrangement means is provided with batch rearrangement means for rearranging all effective data blocks on the log region to a position on the new original region where all the effective data blocks are supposed to be originally written at the time of the transition to the normal mode by the mode setting means.

4. The disk control mechanism according to claim 2, further comprising:

mode setting means for setting the disk apparatus either to a log mode or to a non-log mode upon receipt of a transition setting instruction either to the log mode or to the non-log mode from the host device, wherein the mode setting means sets the mode in such a manner that the data designated by the disk write request given from the host device is written on the log region with the addition of the control block in the log mode while the data is written on the original region as it is in the non-log mode.

5. The disk control mechanism according to claim 4, wherein the rearrangement means is provided with batch rearrangement means for rearranging all the effective data blocks on the log region to a position on the new original region where all effective data blocks are supposed to be originally written at the time of the transition to the normal mode by the mode setting means.

6. The disk control mechanism according to claim 1, wherein the collecting means stores a control block which is added to a queue of the data blocks in the log region, the control block including a reverse index showing the position on the original region where each of the data blocks which are continuously stored is supposed to be originally written, the disk control mechanism further comprising:

recovery processing means for reading the reverse index from the control block on the log region at the time of start-up and for recovering a forward index showing a correspondence relationship between a position on the log region of the data block and a position on the original region on which the data block is supposed to be originally written from the reverse index on a forward index storage region provided on a volatile memory; and read processing means for, in the case where the read request is given from the host device, judging which of the log region or the original region the data block designated by the read request is stored by referring to the forward index storage region on the basis of the read request to read the data block corresponding to the read request either from the log region or from the original region on the basis of the judgment result thereof;

wherein the rearrangement means eliminates the forward index of the data block which is rearranged from the forward index storage region at the time of the rearrangement of the data block.

7. The disk control mechanism according to claim 6, further comprising:

mode setting means for setting the disk apparatus either to a log mode or to a non-log mode upon receipt of a transition setting instruction either to the log mode or to the non-log mode from the host device, wherein the mode setting means sets the mode in such a manner that the data designated by the disk write request given from the host device is written on the log region with the addition of the control block in the log mode while the data is written on the original region as it is in the non-log mode.

8. The disk control mechanism according to claim 7, wherein the rearrangement means is provided with batch rearrangement means for rearranging all effective data blocks on the log region to a position on the new original region where all effective data blocks are supposed to be originally written at the time of the transition to the normal mode by the mode setting means.

9. The disk control mechanism according to claim 6, further comprising:

mode setting means for setting the disk apparatus either to a log mode or to a normal mode upon receipt of a transition setting instruction either to the log mode or to the normal mode from the host device, wherein the mode setting means allocates at least the original region of the original region, the log region and the log control region allocated in the log mode at the time of the transition to the normal mode to a new original region for the normal mode, and allocates a memory region which is a divided memory region including the original region allocated in the normal mode to the new original region, the log region and the log control region for the log mode at the time of the transition to the log mode;

wherein the rearrangement means is provided with batch rearrangement means for rearranging all effective data blocks on the log region to a position on the new original region where all effective data blocks are supposed to be originally written at the time of the transition to the normal mode by the mode setting means.

10. A computer system comprising:

a plurality of computers provided with the disk control mechanism according to claim 6; and a disk apparatus shared by each of the computers.

11. The disk control mechanism according to claim 1, further comprising:

mode setting means for setting the disk apparatus either to a log mode or to a non-log mode upon receipt of a transition setting instruction from the host device, wherein the mode setting means sets the mode in such a manner that the data designated by the disk write request given from the host device is written on the log region with the addition of the control block in the log mode while the data is written on the original region as it is in the non-log mode.

12. The disk control mechanism according to claim 11, wherein the rearrangement means is provided with batch rearrangement means for rearranging all effective data blocks on the log region to a position on the new original region where all of effective data blocks are supposed to be originally written at the time of the transition to the normal mode by the mode setting means.

13. The disk control mechanism according to claim 1, further mode setting means for setting the disk apparatus either to a log mode or to a normal mode upon receipt of a transition setting instruction either to the log mode or to the normal mode from the host device, wherein the mode setting means allocates the original region of the original region, the log region and the log control region allocated in the log mode at the time of the transition to the normal mode to a new original region for the normal mode, and allocates a memory region which is a divided memory region including the original region allocated in the normal mode to the new original region, the log region and the log control region for the log mode at the time of the transition to the log mode;

wherein the rearrangement means is provided with batch rearrangement means for rearranging all effective data blocks on the log region to a position on the new original region where all effective data blocks are supposed to be originally written at the time of the transition to the normal mode by the mode setting means.

* * * * *

UNITED STATES PATENT AND TRADEMARK OFFICE
CERTIFICATE OF CORRECTION

PATENT NO. : 6,721,863 B1
DATED : April 13, 2004
INVENTOR(S) : Endo

It is certified that error appears in the above-identified patent and that said Letters Patent is hereby corrected as shown below:

Title page,
Item [57], ABSTRACT,
Line 8, change "store" to -- stores --.
Line 12, change "are" to -- is --.

Column 20,
Line 66, change "arrangement" to -- the rearrangement --.

Column 21,
Lines 2 and 19, change "all the effective" to -- all effective --.

Column 22,
Line 15, change "allocates at least the" to -- allocates the --.
Line 52, change "all of effective" to -- all effective --.
Line 56, change "further" to -- further comprising: --.

Signed and Sealed this

Twenty-ninth Day of June, 2004

JON W. DUDAS
*Acting Director of the United States Patent and Trademark Office*